(12) United States Patent
Matsuoka

(10) Patent No.: US 12,423,034 B2
(45) Date of Patent: Sep. 23, 2025

(54) INFORMATION PROCESSING APPARATUS, IMAGE FORMING APPARATUS, INFORMATION PROCESSING SYSTEM, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Yuki Matsuoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 617 days.

(21) Appl. No.: 17/521,812

(22) Filed: Nov. 8, 2021

(65) Prior Publication Data
US 2022/0405029 A1    Dec. 22, 2022

(30) Foreign Application Priority Data

Jun. 22, 2021   (JP) ................................ 2021-103257

(51) Int. Cl.
*G06F 3/12*   (2006.01)

(52) U.S. Cl.
CPC .......... *G06F 3/1226* (2013.01); *G06F 3/1205* (2013.01); *G06F 3/1232* (2013.01); *G06F 3/1285* (2013.01); *G06F 3/1293* (2013.01)

(58) Field of Classification Search
None
See application file for complete search history.

(56) References Cited

U.S. PATENT DOCUMENTS

| 8,970,889 | B2 | 3/2015 | Sako | |
|---|---|---|---|---|
| 8,976,391 | B2 | 3/2015 | Nanaumi | |
| 2008/0021933 | A1* | 1/2008 | Ono | G06F 3/1288 |
| 2014/0211252 | A1* | 7/2014 | Tsujimoto | G06K 15/007 |
| | | | | 358/1.15 |
| 2014/0355050 | A1* | 12/2014 | Sakai | G06F 3/126 |
| | | | | 358/1.15 |
| 2017/0090831 | A1* | 3/2017 | Januszewski | G06F 3/126 |
| 2018/0349081 | A1* | 12/2018 | Kanamaru | G06F 3/1203 |
| 2019/0303051 | A1* | 10/2019 | Hwang | G06F 3/1238 |

FOREIGN PATENT DOCUMENTS

| JP | 2013205982 | 10/2013 |
|---|---|---|
| JP | 2014006768 | 1/2014 |
| JP | 2018014006 | 1/2018 |
| JP | 2018125583 | 8/2018 |

OTHER PUBLICATIONS

"Notice of Reasons for Refusal of Japan Counterpart Application", issued on Nov. 26, 2024, with English translation thereof, p. 1-p. 6.

* cited by examiner

*Primary Examiner* — Fan Zhang
(74) *Attorney, Agent, or Firm* — JCIPRNET

(57) ABSTRACT

An information processing apparatus includes a processor configured to in a case of executing printing with print settings using a predetermined function, receive, from an image forming apparatus within a predetermined first distance, information on a function executable by an image forming apparatus different from the image forming apparatus within the first distance, the information on the function being stored in the image forming apparatus within the first distance, and store the information on the function, and notify of an image forming apparatus capable of printing with the print settings, based on the information on the function.

17 Claims, 14 Drawing Sheets

FIG. 7

| PRINTER | ID | INSTALLATION LOCATION | FUNCTION | | |
|---|---|---|---|---|---|
| | | | COLOR/MONOCHROME | STAPLE | DOUBLE SIDED |
| IMAGE FORMING APPARATUS 30 | 001 | LATITUDE 35.463569 LONGITUDE 139.627638 ALTITUDE 75 m | MONOCHROME | WITHOUT | WITHOUT |
| IMAGE FORMING APPARATUS 50 | 002 | LATITUDE 35.463561 LONGITUDE 139.627634 ALTITUDE 75 m | COLOR/MONOCHROME | WITH | WITH |

FIG. 8

| ID | POSITION INFORMATION | FUNCTION | | | UPDATE TIME |
|---|---|---|---|---|---|
| | | COLOR/MONOCHROME | STAPLE | DOUBLE SIDED | |
| 002 | - | COLOR/MONOCHROME | WITH | WITH | 6/1/2021 10:36 |
| - | - | - | - | - | - |
| - | - | - | - | - | - |
| - | - | - | - | - | - |

FIG. 9A

| ID | POSITION INFORMATION | FUNCTION | | | UPDATE TIME |
|---|---|---|---|---|---|
| | | COLOR/MONOCHROME | STAPLE | DOUBLE SIDED | |
| - | - | - | - | - | - |
| - | - | - | - | - | - |
| - | - | - | - | - | - |
| - | - | - | - | - | - |

FIG. 9B

| ID | POSITION INFORMATION | FUNCTION | | | UPDATE TIME |
|---|---|---|---|---|---|
| | | COLOR/MONOCHROME | STAPLE | DOUBLE SIDED | |
| 002 | - | COLOR/MONOCHROME | WITH | WITH | 6/1/2021 10:36 |
| - | - | - | - | - | - |
| - | - | - | - | - | - |
| - | - | - | - | - | - |

FIG. 10

| ID | POSITION INFORMATION | FUNCTION | | | UPDATE TIME |
|---|---|---|---|---|---|
| | | COLOR/MONOCHROME | STAPLE | DOUBLE SIDED | |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |
| - | - | - | - | - | - |

FIG. 11

| ID | POSITION INFORMATION | FUNCTION | | | UPDATE TIME |
|---|---|---|---|---|---|
| | | COLOR/MONOCHROME | STAPLE | DOUBLE SIDED | |
| 001 | - | MONOCHROME | WITHOUT | WITHOUT | 6/1/2021 10:55 |
| - | - | - | - | - | - |
| - | - | - | - | - | - |
| - | - | - | - | - | - |

FIG. 12A

| ID | POSITION INFORMATION | FUNCTION | | | UPDATE TIME |
|---|---|---|---|---|---|
| | | COLOR/MONOCHROME | STAPLE | DOUBLE SIDED | |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |
| - | - | - | - | - | - |

FIG. 12B

| ID | POSITION INFORMATION | FUNCTION | | | UPDATE TIME |
|---|---|---|---|---|---|
| | | COLOR/MONOCHROME | STAPLE | DOUBLE SIDED | |
| 001 | - | MONOCHROME | WITHOUT | WITHOUT | 6/1/2021 10:55 |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |

FIG. 13

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 10:56 |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |

FIG. 14

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |

FIG. 15

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 10:38 |
| - | - | - | - | - | - |
| - | - | - | - | - | - |

FIG. 16

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 11:08 |
| - | - | - | - | - | - |
| - | - | - | - | - | - |

FIG. 17

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 11:08 |
| - | - | - | - | - | - |
| - | - | - | - | - | - |

FIG. 18

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 11:10 |
| - | - | - | - | - | - |
| - | - | - | - | - | - |

FIG. 19

| ID | POSITION INFORMATION | FUNCTION | | | UPDATE TIME |
|---|---|---|---|---|---|
| | | COLOR/MONOCHROME | STAPLE | DOUBLE SIDED | |
| 001 | LATITUDE 35.463569 LONGITUDE 139.627638 ALTITUDE 75 m | MONOCHROME | WITHOUT | WITHOUT | 6/1/2021 11:05 |
| 002 | LATITUDE 35.463561 LONGITUDE 139.627634 ALTITUDE 75 m | COLOR/MONOCHROME | WITH | WITH | 6/1/2021 11:10 |
| - | - | - | - | - | - |
| - | - | - | - | - | - |

INFORMATION PROCESSING APPARATUS, IMAGE FORMING APPARATUS, INFORMATION PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-103257 filed Jun. 22, 2021.

BACKGROUND

(i) Technical Field

The present invention relates to an information processing apparatus, an image forming apparatus, an information processing system, and a non-transitory computer readable medium storing an information processing program.

(ii) Related Art

JP2018-014006A discloses a system including a mobile terminal having a wireless communication unit and an image forming apparatus, in which the image forming apparatus is provided with a unit that broadcasts information for connecting to the mobile terminal and information relating to a function of the image forming apparatus, and the mobile terminal is provided with a discriminating unit that discriminates the image forming apparatus from information received from the image forming apparatus, and a determination unit that determines whether or not the image forming apparatus can execute settings of a print job to be executed, based on the information received from the image forming apparatus.

SUMMARY

A system has been proposed in which an image forming apparatus and an information processing apparatus communicate with each other to determine whether or not printing is possible with the print settings set for a print job of the information processing apparatus.

However, the system only determines whether printing is possible with print settings, and cannot determine which image forming apparatus can print with the print settings. Therefore, in a case where the user approaches an image forming apparatus that cannot print with the print settings and tries to use the image forming apparatus, the user finds that the image forming apparatus cannot print, and the user needs to search for another image forming apparatus capable of printing.

Aspects of non-limiting embodiments of the present disclosure relate to an information processing apparatus, an image forming apparatus, an information processing system, and a non-transitory computer readable medium storing an information processing program that enable to a user to confirm an image forming apparatus capable of printing even in a case where the user approaches an image forming apparatus that cannot perform printing with the print settings, without searching for the image forming apparatus by the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: in a case of executing printing with print settings using a predetermined function, receive, from an image forming apparatus within a predetermined first distance, information on a function executable by an image forming apparatus different from the image forming apparatus within the first distance, the information on the function being stored in the image forming apparatus within the first distance, and store the information on the function; and notify of an image forming apparatus capable of printing with the print settings, based on the information on the function.

BRIEF DESCRIPTION OF THE DRAWINGS

Exemplary embodiment(s) of the present invention will be described in detail based on the following figures, wherein:

FIG. 7 is an explanatory diagram for explaining an example of an installation state of the image forming apparatus according to the exemplary embodiment of the present invention;

FIG. 8 is an explanatory diagram for explaining a printer information list according to the exemplary embodiment of the present invention;

FIGS. 9A and 9B are explanatory diagrams for explaining the printer information list according to the exemplary embodiment of the present invention;

FIG. 10 is an explanatory diagram for explaining the printer information list according to the exemplary embodiment of the present invention;

FIG. 11 is an explanatory diagram for explaining the printer information list according to the exemplary embodiment of the present invention;

FIGS. 12A and 12B are explanatory diagrams for explaining the printer information list according to the exemplary embodiment of the present invention;

FIG. 13 is an explanatory diagram for explaining the printer information list according to the exemplary embodiment of the present invention;

FIG. 14 is an explanatory diagram for explaining the printer information list according to the exemplary embodiment of the present invention;

FIG. 15 is an explanatory diagram for explaining the printer information list according to the exemplary embodiment of the present invention;

FIG. 16 is an explanatory diagram for explaining the printer information list according to the exemplary embodiment of the present invention;

FIG. 17 is an explanatory diagram for explaining the printer information list according to the exemplary embodiment of the present invention;

FIG. 18 is an explanatory diagram for explaining the printer information list according to the exemplary embodiment of the present invention; and FIG. 19 is an explanatory diagram for explaining the printer information list according to the exemplary embodiment of the present invention.

DETAILED DESCRIPTION

Exemplary Embodiment

Figure 1:
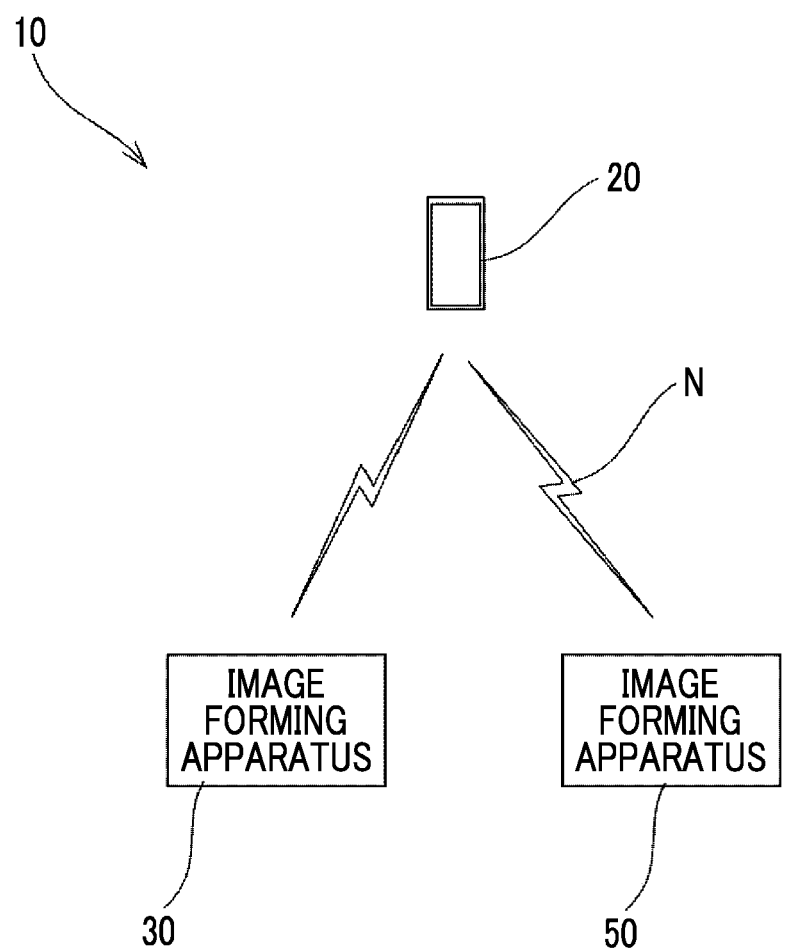
FIG. 1 is a schematic configuration diagram of an information processing system according to an exemplary embodiment of the present invention.

Hereinafter, an example of the exemplary embodiment of the present disclosure will be described with reference to the drawings. The same reference numerals are given to the same or equivalent components and parts in each drawing. In addition, the dimensional ratios in the drawings are exaggerated for convenience of explanation and may differ from the actual ratios.

An example of an information processing system 10 according to the present exemplary embodiment will be described, with reference to FIG. 1.

FIG. 1 is a diagram showing an example of a schematic configuration of the information processing system 10 according to the present exemplary embodiment.

As shown in FIG. 1, the information processing system 10 according to the present exemplary embodiment includes a smartphone 20 and a plurality of image forming apparatuses 30 and 50. The smartphone 20 is an example of the information processing apparatus.

The smartphone 20 and the plurality of image forming apparatuses 30 and 50 are connected via a network N. This network N can connect to Bluetooth (registered trademark) Low Energy (BLE) and Near field communication (NFC). Here, BLE and NFC are communication schemes having different communicable distances between the smartphone 20 and the image forming apparatuses 30 and 50, BLE is an example of a communication scheme capable of communicating at a first distance, and NFC is an example of a communication scheme capable of communicating at a second distance shorter than the first distance. The example of the communication scheme capable of the second distance communication is not limited to BLE, and may be another communication scheme. Further, the example of the communication scheme capable of the first distance communication is not limited to NFC, and may be another communication scheme. Here, whether or not the distance is within the first distance is determined by whether or not the distance is within the range of the radio waves output from the image forming apparatuses 30 and 50. Further, whether or not the distance is within the second distance is determined by whether or not the smartphone 20 and the image forming apparatuses 30 and 50 are in contact (touch). Further, the plurality of image forming apparatuses 30 and 50 may be connected to the network via, for example, LAN (=Local Area Network), WAN (=Wide Area Network), the Internet, or the like. Further, a Personal Computer (PC) may be connected to the information processing system 10 via a network.

The smartphone 20 is a mobile terminal owned by the user. Then, the user prints the data stored in the smartphone 20 using the image forming apparatuses 30 and 50.

Figure 2:
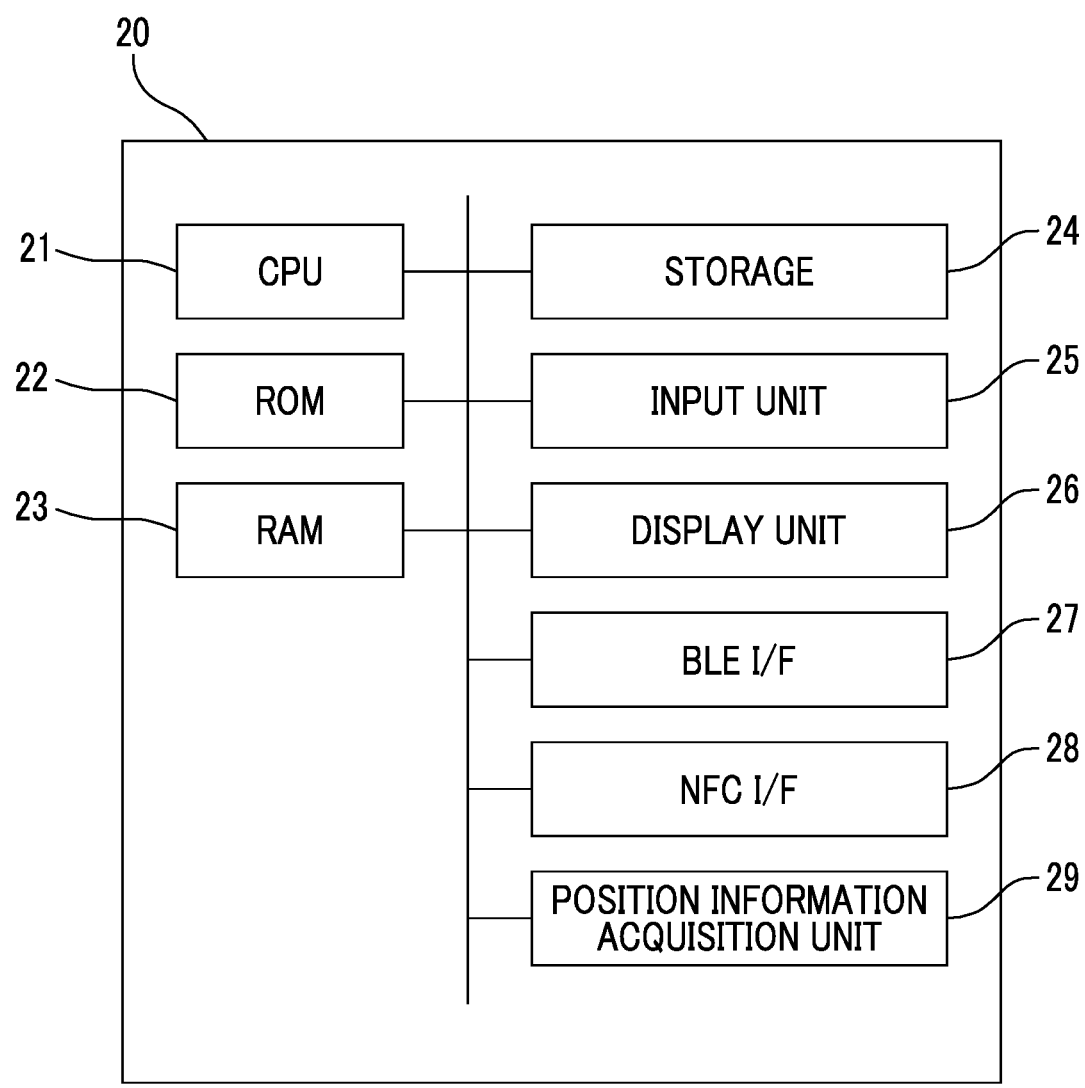
FIG. 2 is a schematic block diagram of a smartphone according to the exemplary embodiment of the present invention.

FIG. 2 is a block diagram showing a hardware configuration of the smartphone 20 according to the present exemplary embodiment.

As shown in FIG. 2, the smartphone 20 includes a Central Processing Unit (CPU) 21 which is an example of a processor, a Read Only Memory (ROM) 22, a Random Access Memory (RAM) 23, a storage 24, an input unit 25, a display unit 26, a BLE I/F 27, an NFC I/F 28, and a position information acquisition unit 29. Components are communicably connected to each other via a bus.

The CPU 21 is a central arithmetic processing unit and executes various programs or controls each unit. That is, the CPU 21 reads a program from the ROM 22 or the storage 24, and executes the program using the RAM 23 as a work area. The CPU 21 controls each of the above components and performs various arithmetic processes, according to the program recorded in the ROM 22 or the storage 24. In the present exemplary embodiment, the program is stored in the ROM 22 or the storage 24.

The ROM 22 stores various programs and various data. The RAM 23 temporarily stores a program or data as a work area. The storage 24 is composed of a solid state drive (SSD), a flash memory, and the like, and stores various programs including an operating system and various data.

Further, in the present exemplary embodiment, the storage 24 stores a printer information list listing the image forming apparatuses 30 and 50. The printer information list is transmitted and received to and from the image forming apparatuses 30 and 50 as described later. The printer information list includes information on the ID of each image forming apparatus, the functions that can be executed by each image forming apparatus, the position information (latitude, longitude, and altitude) of each image forming apparatus, and the update time of the printer information list. The printer information list may include other types of information. Further, in the present exemplary embodiment, the storage 24 stores a printing application program for printing data from the smartphone 20 by using the image forming apparatuses 30 and 50.

The input unit 25 includes, for example, a pointing device such as a mouse and a keyboard, and is used to perform various inputs. The input unit 25 is used for print settings, instructions for starting printing, and the like, as will be described later. Further, in the present exemplary embodiment, the touch panel type display unit 26 functions as the input unit 25.

The display unit 26 is, for example, a liquid crystal display. The display unit 26 displays various types of information based on the control of the CPU 21. Further, in the present exemplary embodiment, the display unit 26 adopts a touch panel type and also functions as an input unit 25.

The BLE I/F 27 has a function of performing wireless communication by BLE with the image forming apparatuses 30 and 50. The BLE I/F 27 includes an antenna for wireless communication and functions as a communication interface for transmitting and receiving various data to and from the image forming apparatuses 30 and 50.

The NFC I/F 28 has a function of performing wireless communication by short-range wireless communication with the image forming apparatuses 30 and 50. The NFC I/F 28 includes an antenna for wireless communication and functions as a communication interface for transmitting and receiving various data to and from the image forming apparatuses 30 and 50.

The position information acquisition unit 29 acquires the position information on the smartphone 20. The position information acquisition unit 29 is, for example, a Global Positioning System (GPS).

The plurality of image forming apparatuses 30 and 50 are capable of printing, copying, facsimile, scanning and the like. Further, each of the image forming apparatuses 30 and 50 has each function capable of executing printing with the print settings of the printing application program of the smartphone 20. In the present exemplary embodiment, the functions of the image forming apparatuses 30 and 50 are different from each other, and printing may or may not be possible, depending on the print settings of the printing application program of the smartphone 20.

Next, the hardware configurations of the plurality of image forming apparatuses 30 and 50 will be described. The common hardware configuration of the plurality of image forming apparatuses 30 and 50 will be described by using the image forming apparatus 30 as an example.

Figure 3:
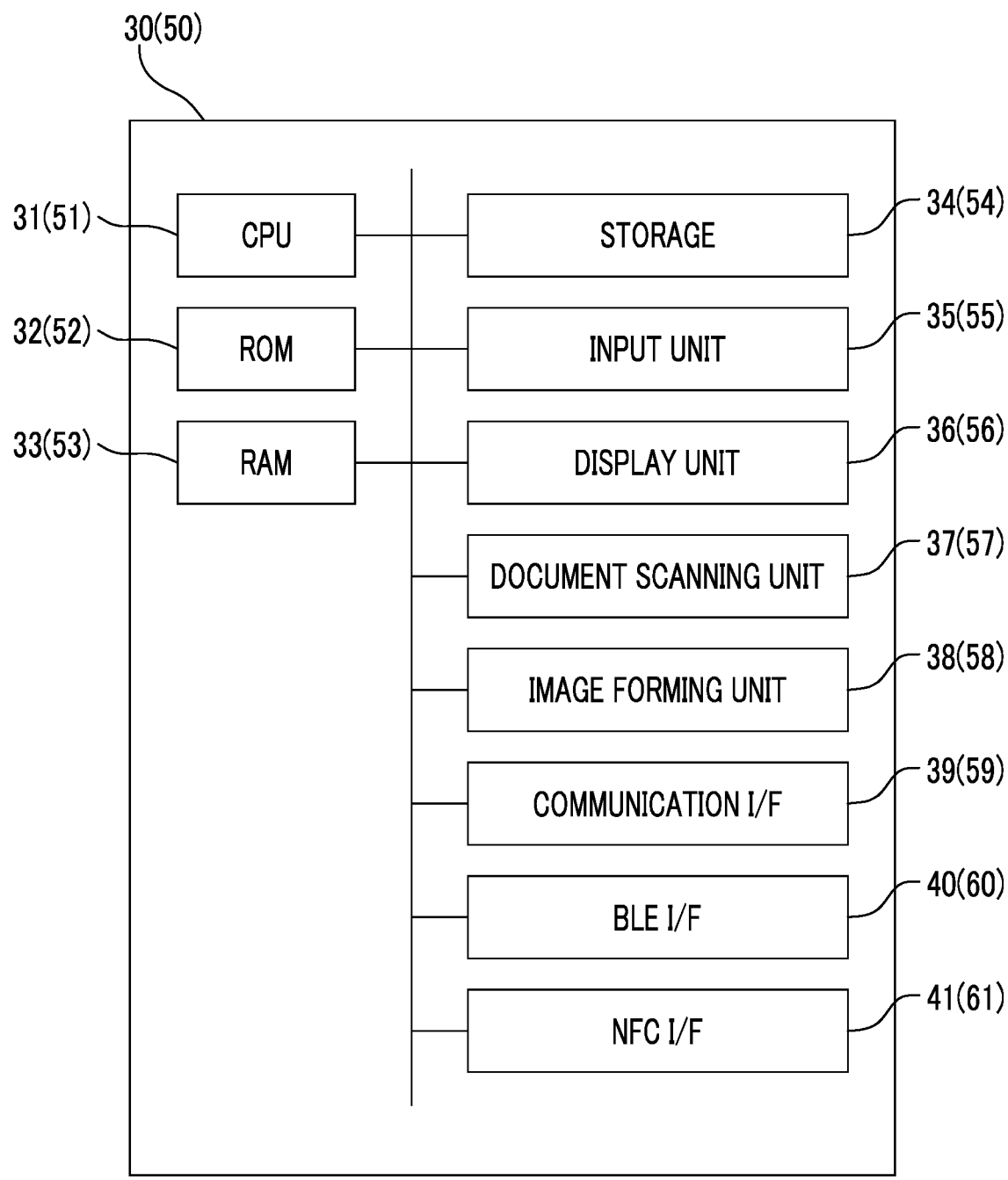
FIG. 3 is a schematic block diagram of an image forming apparatus according to the exemplary embodiment of the present invention.

FIG. 3 is a block diagram showing a hardware configuration of the image forming apparatus 30 according to the present exemplary embodiment.

As shown in FIG. 3, the image forming apparatus 30 includes a CPU 31 that is an example of a processor, a ROM 32, a RAM 33, a storage 34 that is an example of a storage unit, an input unit 35, a display unit 36, a document scanning unit 37, and an image forming unit 38, a communication I/F 39, a BLE I/F 40, and an NFC I/F 41. Components are communicably connected to each other via a bus.

The CPU 31 is a central processing unit and executes various programs or controls each unit. That is, the CPU 31 reads a program from the ROM 32 or the storage 34, and executes the program using the RAM 33 as a work area. The CPU 31 controls each of the above components and performs various arithmetic processes, according to the program recorded in the ROM 32 or the storage 34. In the present exemplary embodiment, the program is stored in the ROM 32 or the storage 34.

The ROM 32 stores various programs and various data. The RAM 33 temporarily stores a program or data as a work area. The storage 34 is configured by a hard disk drive (HDD), a solid state drive (SSD), or the like, and stores various programs including an operating system and various data.

Further, in the present exemplary embodiment, the storage 34 stores a printer information list in which the image forming apparatus 30 and other image forming apparatus 50 are listed. The printer information list is transmitted and received to and from the smartphone 20 as described later. The printer information list includes information on the ID of each image forming apparatus, the functions that can be executed by each image forming apparatus, the position information (latitude, longitude, and altitude) of each image forming apparatus, and the update time of the printer information list. The printer information list may include other types of information.

The input unit 35 includes, for example, a pointing device such as a mouse and a keyboard, and is used to perform various inputs. The input unit 35 is used for giving an instruction to start printing. Further, in the present exemplary embodiment, the touch panel type display unit 36 functions as the input unit 35.

The display unit 36 is, for example, a liquid crystal display. The display unit 36 displays various types of information based on the control of the CPU 31. Further, the display unit 36 adopts a touch panel type and also functions as an input unit 35.

The document scanning unit 37 captures documents placed on a paper feed tray of an automatic feeding device (not shown) provided above the image forming apparatus 30 one by one, and optically reads the captured documents to obtain image information. Alternatively, the document scanning unit 37 optically reads a document placed on a table such as platen glass to obtain image information.

Here, the image information on the document read by the document scanning unit 37 is stored in the storage 34 of the image forming apparatus 30, printed by the image forming unit 38 described later, or transmitted to another image forming apparatus having a facsimile (fax) function by the communication I/F 39 described later.

The image forming unit 38 forms, that is, prints, on a recording medium such as paper, print data included in the print job obtained from the smartphone 20 connected via the network N or an image based on the image information obtained by the document scanning unit 37's scanning.

The communication I/F 39 connects the image forming apparatus 30 to a public line, and transmits and receives the image information obtained by the document scanning unit 37's scanning to and from another image forming apparatus having a FAX function.

The BLE I/F 40 has a function of performing wireless communication by BLE with the smartphone 20. The BLE I/F 40 includes an antenna for wireless communication and functions as a communication interface for transmitting and receiving various data to and from the smartphone 20.

The NFC I/F 41 has a function of performing wireless communication with the smartphone 20 by short-range wireless communication. The NFC I/F 41 includes an antenna for wireless communication and functions as a communication interface for transmitting and receiving various data to and from the smartphone 20.

Further, although not shown, in the present exemplary embodiment, the image forming apparatus 50 includes a staple device and a double-sided printing device that the image forming apparatus 30 does not have. The staple device is a device for binding paper. The double-sided printing device is a device that enables printing on both sides of paper. Further, in the present exemplary embodiment, the image forming unit 38 of the image forming apparatus 30 can perform printing only in monochrome, and the image forming unit 58 of the image forming apparatus 50 can perform printing in color and monochrome.

Next, an example of the operation of the information processing system 10 of the present exemplary embodiment will be described.

Figure 4:
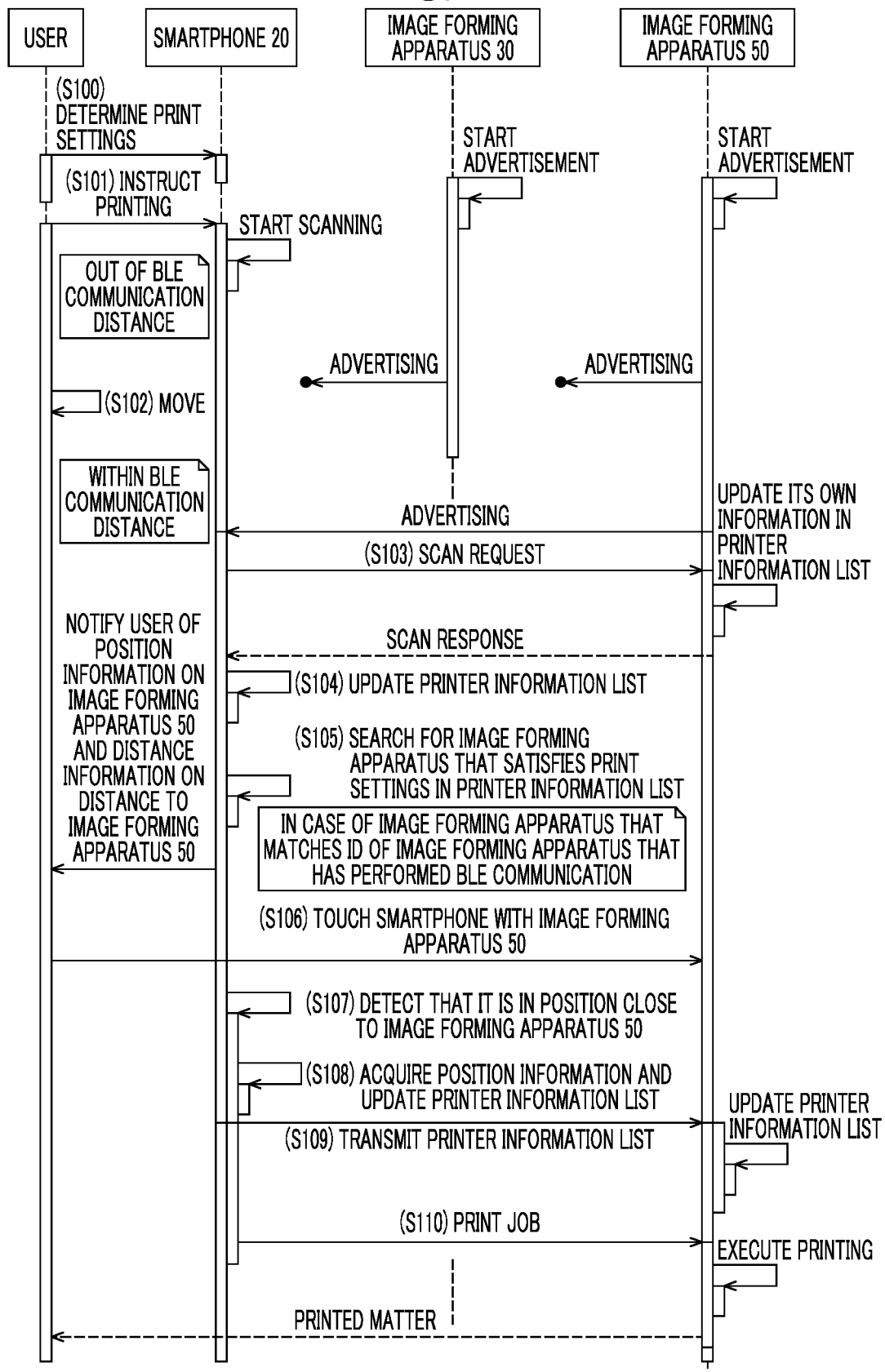
FIG. 4 is a sequence diagram showing an example of the operation of the information processing system according to the exemplary embodiment of the present invention.

FIG. 4 is a sequence diagram showing an example of the operation of the information processing system 10.

First, as shown in FIG. 7, it is assumed that the image forming apparatuses 30 and 50 are installed. Specifically, the image forming apparatus 30 is an apparatus having an ID "001", an installation location "latitude 35.463569, longitude 139.627638, and altitude 75 m", functions "monochrome", "without staple", and "without double-sided", and the image forming apparatus 50 is an apparatus having an ID "002", an installation location "latitude 35.463561, longitude 139.627634, and altitude 75 m", functions "color/monochrome", "with staples", and "with double-sided". The installation location is not determined when the image forming apparatuses 30 and 50 are installed, and is acquired from the smartphone 20 at the time of printing, as will be described later. Further, here, a state in which the user's smartphone 20 has no data in the printer information list, and the image forming apparatuses 30 and 50 also have no data in the printer information list other than the information related to the functions of the image forming apparatuses 30 and 50, that is, the state of printing for the first time will be described.

In step S100 shown in FIG. 4, the print setting determined by the user on the smartphone 20 is set in the printing application program. For example, a case where "color", "single-sided printing", and "with staples" are set as print settings will be described.

Here, the image forming apparatuses 30 and 50 are on the peripheral side of the BLE and periodically transmit advertisement packets of the BLE to prepare for the connection with the smartphone 20.

In step S101, the user instructs printing on the smartphone 20. The smartphone 20 that has received the print instruction starts scanning to search for the image forming apparatuses 30 and 50 within the BLE communication range.

In step S102, the user moves with the smartphone 20. Then, the smartphone 20 receives an advertising packet output from, for example, the image forming apparatus 50, among the plurality of image forming apparatuses 30 and 50. That is, the smartphone 20 enters the BLE radio wave range (communication range) of the image forming apparatus 50.

In step S103, the smartphone 20 transmits a scan request to the image forming apparatus 50. Upon receiving the scan request, the image forming apparatus 50 updates the printer information list as shown in FIG. 8. Here, the image forming apparatus 50 writes the information in the storage area of the printer information list. Then, the image forming apparatus 50 transmits the updated printer information list to the smartphone 20 by a scan response.

In step S104, the smartphone 20 updates the printer information list stored in the storage 24 with the received printer information list. Specifically, the ID, function, and update time of the image forming apparatus 50 as shown in FIG. 9B are written in the storage area of the printer information list of the storage 24 as shown in FIG. 9A.

In step S105, the smartphone 20 searches for an image forming apparatus that satisfies the print setting in the updated printer information list. In the present example, since only the image forming apparatus 50 is registered in the printer information list, it is determined whether or not printing with the print settings of "color", "single-sided printing", and "with staples" can be performed by the image forming apparatus 50. Since the image forming apparatus 50 can performing printing of "color", "single-sided printing", and "with staples", the display unit 26 of the smartphone 20 displays that the image forming apparatus 50 can print. In this case, the user is notified of the position information on the image forming apparatus 50 and the distance information on a distance to the image forming apparatus 50. Here, as for the position information on the image forming apparatus 50, the latitude and longitude information may be displayed on the display unit 26 of the smartphone 20 as the position information on the image forming apparatus 50, or the direction may be displayed on the display unit 26 of the smartphone 20.

In step S106, in a case where the user moves to the front of the image forming apparatus 50, the smartphone 20 communicates with the image forming apparatus 50 using NFC. That is, by touching the smartphone 20 with the image forming apparatus 50, the NFC I/F 28 of the smartphone 20 and the NFC I/F 61 of the image forming apparatus 50 are communicated with each other.

In step S107, in a case where the smartphone 20 and the image forming apparatus 50 communicate with each other using NFC in step S106, the smartphone 20 detects that the smartphone 20 is in a position close to the image forming apparatus 50.

In step S108, the smartphone 20 acquires the position information by the position information acquisition unit 29, and adds the position information to the printer information list to update the printer information list, as shown in FIG. 10. Here, the position information on the smartphone 20 acquired by the position information acquisition unit 29 is the latitude, longitude, and altitude information on the smartphone 20. Since the smartphone 20 and the image forming apparatus 50 communicate with each other by NFC and the NFC communication range is short enough that the smartphone 20 and the image forming apparatus 50 need to contact each other, the position information on the image forming apparatus 50 and the position information on the smartphone 20 are almost the same, so that the position information acquisition unit 29 of the smartphone 20 substitutes for the acquisition of the position information on the image forming apparatus 50. In the present example, since the image forming apparatuses 30 and 50 do not have the position information acquisition unit, the position information is acquired by the position information acquisition unit 29 which is often provided in the smartphone 20, but in a case where the image forming apparatuses 30 and 50 have the position information acquisition unit, the position information acquired by the position information acquisition units of the image forming apparatuses 30 and 50 may be stored in the printer information list.

In step S109, the smartphone 20 transmits the printer information list (see FIG. 10) stored in the storage 24 to the image forming apparatus 50. Then, the image forming apparatus 50 updates the printer information list stored in the storage 54. The printer information list stored in the image forming apparatus 50 in this case is equivalent to the printer information list stored in the smartphone 20 shown in FIG. 10.

In step S110, the smartphone 20 transmits the print job to the image forming apparatus 50 using the NFC I/F 28. The transmission of the print job is not limited to the case where it is performed using NFC I/F 28, and may be performed using BLE I/F 27. Then, the image forming apparatus 50 executes printing according to the set print settings.

Here, it is desirable that steps S107 to S110 are performed, for example, while the user is touching the smartphone 20 with the image forming apparatus 50 in step S106. Further, in a case where steps S107 to S110 are not performed while the user touches the smartphone 20 with the image forming apparatus 50 in step S106, the user touches the smartphone 20 with the image forming apparatus 50 again.

Figure 5:
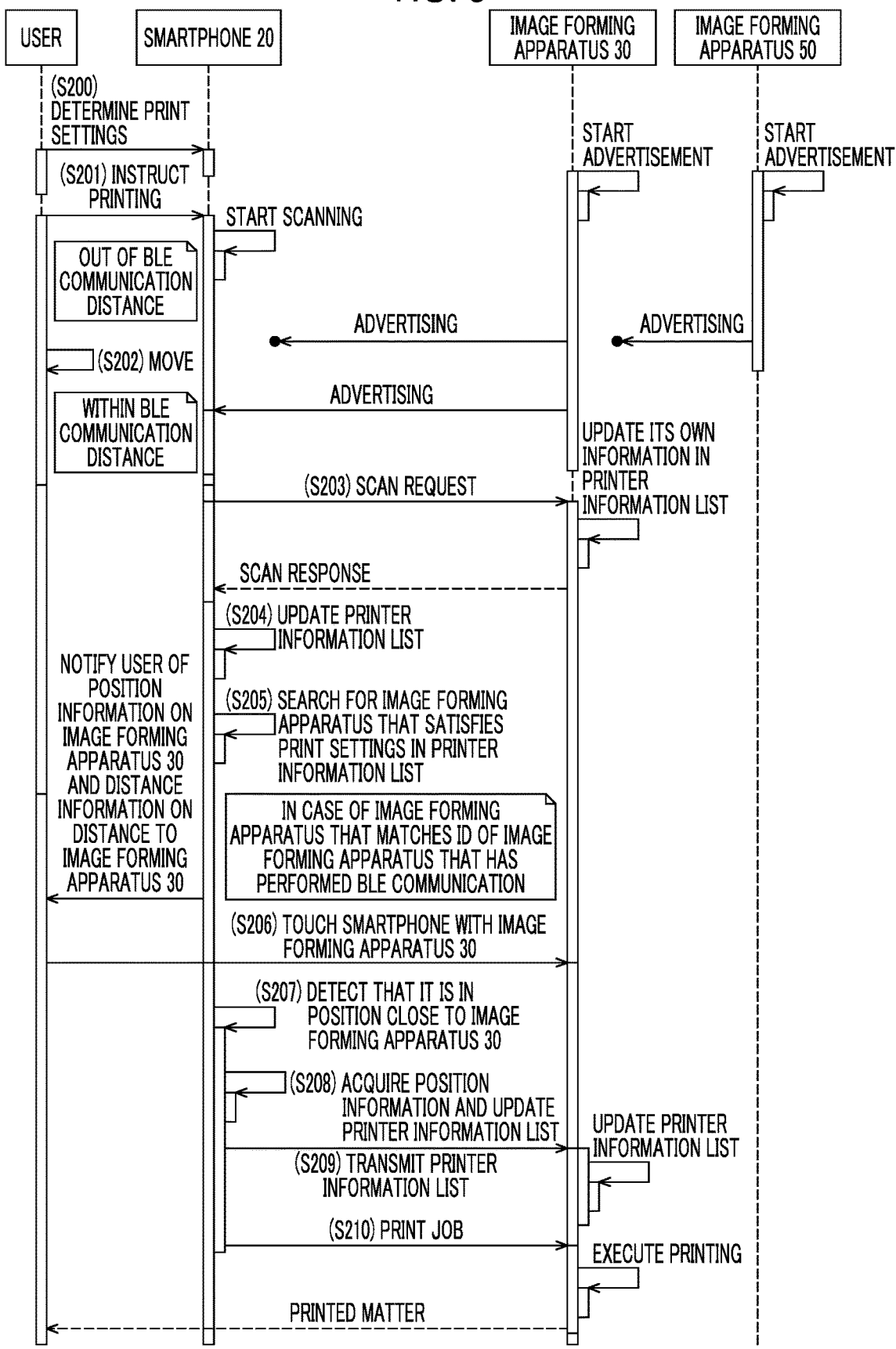
FIG. 5 is a sequence diagram showing an example of the operation of the information processing system following FIG. 4.

FIG. 5 is a sequence diagram showing an example of an operation following an example of the operation of the information processing system 10 shown in FIG. 4. Specifically, it is an example of an operation when printing is performed for the first time by the image forming apparatus 30.

In step S200 shown in FIG. 5, the print setting determined by the user on the smartphone 20 is set in the printing application program. For example, a case where "monochrome", "single-sided printing", and "without staple" are set as print settings will be described.

Here, the image forming apparatuses 30 and 50 are on the peripheral side of the BLE and periodically transmit advertisement packets of the BLE to prepare for the connection with the smartphone 20.

In step S201, the user instructs printing on the smartphone 20. The smartphone 20 that has received the print instruction starts scanning to search for the image forming apparatuses 30 and 50 within the BLE communication range.

In step S202, the user moves with the smartphone 20. Then, the smartphone 20 receives an advertising packet output from, for example, the image forming apparatus 30, among the plurality of image forming apparatuses 30 and 50. That is, the smartphone 20 enters the BLE radio wave range (communication range) of the image forming apparatus 30.

In step S203, the smartphone 20 transmits a scan request to the image forming apparatus 30. Upon receiving the scan request, the image forming apparatus 30 updates the printer information list as shown in FIG. 11. Here, the image forming apparatus 30 updates the information in the printer information list. Then, the image forming apparatus 30 transmits the updated printer information list to the smartphone 20 by a scan response.

In step S204, the smartphone 20 updates the printer information list stored in the storage 24 with the received printer information list. Specifically, the ID, function, and update time of the image forming apparatus 30 as shown in FIG. 12B are written in the storage area of the printer information list of the storage 24 as shown in FIG. 12A. Further, since the printer information on the image forming apparatus 50 is also stored in the printer information list stored in the smartphone 20, the printer information on the image forming apparatus 30 is added.

In step S205, the smartphone 20 searches for an image forming apparatus that satisfies the print setting in the updated printer information list. In the present example, since the image forming apparatus 30 and the image forming apparatus 50 are registered in the printer information list, it is determined whether or not printing with the print settings of "monochrome", "single-sided printing", and "without staples" can be performed by the image forming apparatus 30 and the image forming apparatus 50. Since both the image forming apparatus 30 and the image forming apparatus 50 can perform printing of "monochrome", "single-sided printing", and "without staple", the closest image forming apparatus 30, among the image forming apparatus 30 and the image forming apparatus 50, is notified on the display unit 26 of the smartphone 20. In this case, the user is notified of the position information on the image forming apparatus 30 and the distance information on a distance to the image forming apparatus 30. Here, as for the position information on the image forming apparatus 30, the latitude and longitude information may be displayed on the display unit 26 of the smartphone 20 as the position information on the image forming apparatus 30, or the direction may be displayed on the display unit 26 of the smartphone 20. In addition to the case where the closest image forming apparatus 30 is notified, all the image forming apparatus 30 and 50 capable of printing may be displayed, and the closest image forming apparatus 30 may be highlighted by highlighting or the like.

In step S206, in a case where the user moves to the front of the image forming apparatus 30, the smartphone 20 communicates with the image forming apparatus 30 using NFC. That is, by touching the smartphone 20 with the image forming apparatus 30, the NFC I/F 28 of the smartphone 20 and the NFC I/F 41 of the image forming apparatus 30 are communicated with each other.

In step S207, in a case where the smartphone 20 and the image forming apparatus 30 communicate with each other using NFC in step S206, the smartphone 20 detects that the smartphone 20 is in a position close to the image forming apparatus 30.

In step S208, the smartphone 20 acquires the position information by the position information acquisition unit 29, and adds the position information to the printer information list to update the printer information list, as shown in FIG. 13. Here, the position information on the smartphone 20 acquired by the position information acquisition unit 29 is the latitude, longitude, and altitude information on the smartphone 20. Since the smartphone 20 and the image forming apparatus 30 communicate with each other by NFC and the NFC communication range is short enough that the smartphone 20 and the image forming apparatus 30 need to contact each other, the position information on the image forming apparatus 30 and the position information on the smartphone 20 are almost the same, so that the position information acquisition unit 29 of the smartphone 20 substitutes for the acquisition of the position information on the image forming apparatus 30.

In step S209, the smartphone 20 transmits the printer information list (see FIG. 13) stored in the storage 24 to the image forming apparatus 30. Then, the image forming apparatus 30 updates the printer information list stored in the storage 34. The printer information list stored in the image forming apparatus 30 in this case is equivalent to the printer information list stored in the smartphone 20 shown in FIG. 13.

In step S210, the smartphone 20 transmits the print job to the image forming apparatus 30 using the NFC I/F 28. The transmission of the print job is not limited to the case where it is performed using NFC I/F 28, and may be performed using BLE I/F 27. Then, the image forming apparatus 30 executes printing according to the set print settings.

Here, it is desirable that steps S207 to S210 are performed, for example, while the user is touching the smartphone 20 with the image forming apparatus 30 in step S206. Further, in a case where steps S207 to S210 are not performed while the user touches the smartphone 20 with the image forming apparatus 30 in step S206, the user touches the smartphone 20 with the image forming apparatus 30 again.

In this way, as the user prints using the image forming apparatuses 30 and 50, the installed image forming apparatuses 30 and 50 are registered in the printer information list, so that it is not necessary to set newly introduced smartphone or image forming apparatus individually. That is, it is not necessary to register the newly introduced smartphone in the image forming apparatus, and it is not necessary to register the newly introduced image forming apparatus in the smartphone.

Further, the users referred to in FIGS. 4 and 5 may be the same person or different persons, and the smartphone 20 may be the same terminal or different terminals.

In a case where there is no image forming apparatus capable of printing with the print settings, a message such as "There is no printable printer" or "Please find another printer" is displayed on the display unit 26 of the smartphone 20.

The case where there is no image forming apparatus capable of printing with the print settings includes, in addition to a case where printing is not possible with all of the installed image forming apparatuses, a case where a printable image forming apparatus is installed but the image forming apparatus is not registered in the printer information list because an image has not been printed yet.

That is, the information processing system 10 of the present exemplary embodiment stores the information on the image forming apparatuses 30 and 50 that have performed printing in the past as a printer information list, and updates the printer information list between the smartphone 20 and the image forming apparatuses 30 and 50 to be able to notify the user of a printable image forming apparatus.

Figure 6:
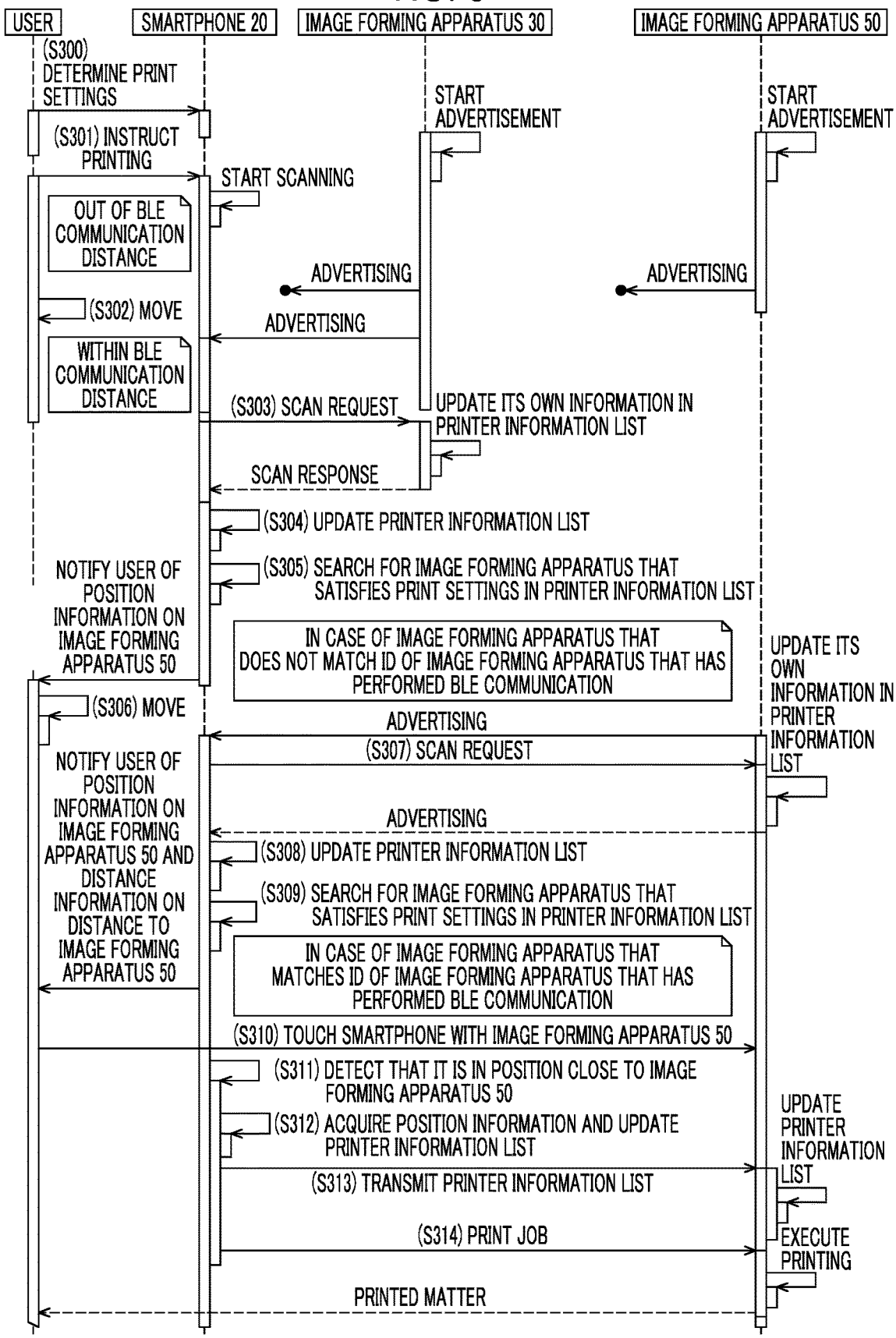
FIG. 6 is a sequence diagram showing another example of the operation of the information processing system following FIG. 5.

FIG. 6 is a sequence diagram showing an example of an operation following an example of the operation of the information processing system 10 shown in FIG. 5. That is, printing has been executed in the past by all the installed image forming apparatuses 30 and 50, and all the image forming apparatuses 30 and 50 are registered in the printer information list.

In step S300 shown in FIG. 6, the print setting determined by the user on the smartphone 20 is set in the printing application program. For example, a case where "color", "double-sided printing", and "without staple" are set as print settings will be described.

Here, the image forming apparatuses 30 and 50 are on the peripheral side of the BLE and periodically transmit advertisement packets of the BLE to prepare for the connection with the smartphone 20.

In step S301, the user instructs printing on the smartphone 20. The smartphone 20 that has received the print instruction starts scanning to search for the image forming apparatuses 30 and 50 within the BLE communication range.

In step S302, the user moves with the smartphone 20. Then, the smartphone 20 receives an advertising packet output from, for example, the image forming apparatus 30, among the plurality of image forming apparatuses 30 and 50. That is, the smartphone 20 enters the BLE radio wave range (communication range) of the image forming apparatus 30.

In step S303, the smartphone 20 transmits a scan request to the image forming apparatus 30. Upon receiving the scan request, the image forming apparatus 30 updates the printer information list as shown in FIG. 14. Here, the image forming apparatus 30 updates the information in the printer information list. Then, the image forming apparatus 30 transmits the updated printer information list to the smartphone 20 by a scan response.

In step S304, the smartphone 20 updates the printer information list stored in the storage 24 with the received printer information list. Specifically, as shown in FIG. 15, the ID, function, and update time are updated.

In step S305, the smartphone 20 searches for an image forming apparatus that satisfies the print setting in the updated printer information list. In the present example, since the image forming apparatus 30 and the image forming apparatus 50 are registered in the printer information list, it is determined whether or not printing with the print settings of "color", "double-sided printing", and "without staple" can be performed by the image forming apparatus 30 and the image forming apparatus 50. Since the image forming apparatus 30 within the BLE communication range cannot perform printing of "color", "double-sided printing", and "without staples", and the image forming apparatus 50 can perform printing, the position information on the image forming apparatus 50 is notified on the display unit 26 of the smartphone 20. Here, as for the position information on the image forming apparatus 50, the latitude and longitude information may be displayed on the display unit 26 of the smartphone 20 as the position information on the image forming apparatus 50, or the direction may be displayed on the display unit 26 of the smartphone 20. Further, the distance information on the distance to the image forming apparatus 50 may be notified.

In step S306, the user notified of the position information on the image forming apparatus 50 moves to the place where the image forming apparatus 50 is installed. Then, the smartphone 20 receives the advertising packet output from the image forming apparatus 50. That is, the smartphone 20 enters the BLE radio wave range (communication range) of the image forming apparatus 50.

In step S307, the smartphone 20 transmits a scan request to the image forming apparatus 50. Upon receiving the scan request, the image forming apparatus 50 updates the printer information list as shown in FIG. 16. Here, the image forming apparatus 50 updates the information in the printer information list. Then, the image forming apparatus 50 transmits the updated printer information list to the smartphone 20 by a scan response.

In step S308, the smartphone 20 updates the printer information list stored in the storage 24 with the received printer information list. Specifically, as shown in FIG. 17, the ID, function, and update time are updated. Further, since the printer information on the image forming apparatus 30 is also stored in the printer information list stored in the smartphone 20, the printer information on the image forming apparatus 50 is updated.

In step S309, the smartphone 20 searches for an image forming apparatus that satisfies the print setting in the updated printer information list. In the present example, since the image forming apparatus 30 and the image forming apparatus 50 are registered in the printer information list, it is determined whether or not printing with the print settings of "color", "double-sided printing", and "without staple" can be performed by the image forming apparatus 30 and the image forming apparatus 50. Since the image forming apparatus 50 within the BLE communication range can perform printing of "color", "double-sided printing", and "without staple", the display unit 26 of the smartphone 20 displays that the image forming apparatus 50 can print. In this case, the user is notified of the position information on the image forming apparatus 50 and the distance information on a distance to the image forming apparatus 50. Here, as for the position information on the image forming apparatus 50, the latitude and longitude information may be displayed on the display unit 26 of the smartphone 20 as the position information on the image forming apparatus 50, or the direction may be displayed on the display unit 26 of the smartphone 20.

In step S310, in a case where the user moves to the front of the image forming apparatus 50, the smartphone 20 communicates with the image forming apparatus 50 using NFC. That is, by touching the smartphone 20 with the image forming apparatus 50, the NFC I/F 28 of the smartphone 20 and the NFC I/F 61 of the image forming apparatus 50 are communicated with each other.

In step S311, in a case where the smartphone 20 and the image forming apparatus 50 communicate with each other using NFC in step S310, the smartphone 20 detects that the smartphone 20 is in a position close to the image forming apparatus 50.

In step S312, the smartphone 20 acquires the position information by the position information acquisition unit 29, and adds the position information to the printer information list to update the printer information list, as shown in FIG. 18. Even in a case where the image forming apparatus 50 is moving, the position information is updated and the information on where the image forming apparatus 50 is located is stored in the printer information list. Here, the position information on the smartphone 20 acquired by the position information acquisition unit 29 is the latitude, longitude, and altitude information on the smartphone 20. Since the smartphone 20 and the image forming apparatus 50 communicate with each other by NFC and the NFC communication range is short enough that the smartphone 20 and the image forming apparatus 50 need to contact each other, the position information on the image forming apparatus 50 and the position information on the smartphone 20 are almost the same, so that the position information acquisition unit 29 of the smartphone 20 substitutes for the acquisition of the position information on the image forming apparatus 50.

In step S313, the smartphone 20 transmits the printer information list (see FIG. 18) stored in the storage 24 to the image forming apparatus 50. Then, as shown in FIG. 19, the image forming apparatus 50 updates the printer information list stored in the storage 54.

In step S314, the smartphone 20 transmits the print job to the image forming apparatus 50 using the NFC I/F 28. The transmission of the print job is not limited to the case where it is performed using NFC I/F 28, and may be performed using BLE I/F 27. Then, the image forming apparatus 50 executes printing according to the set print settings.

Here, it is desirable that steps S311 to S314 are performed, for example, while the user is touching the smartphone 20 with the image forming apparatus 50 in step S310. Further, in a case where steps S311 to S314 are not performed while the user touches the smartphone 20 with the image forming apparatus 50 in step S310, the user touches the smartphone 20 with the image forming apparatus 50 again.

The present invention is not limited to the above-described exemplary embodiment, and various modifications and applications are possible without departing from the gist of the present invention.

In the above exemplary embodiment, the mode in which the program is stored (installed) in the ROM or the storage in advance has been described, but the present invention is not limited to this. The program may be provided in a form recorded on a recording medium such as a Compact Disk Read Only Memory (CD-ROM), a Digital Versaille Disk Read Only Memory (DVD-ROM), and a Universal Serial Bus (USB) memory. Further, the program may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor configured to:
in a case of executing printing with print settings using a predetermined function, receive, from a first image forming apparatus within a predetermined first distance, information on a function executable by a second image forming apparatus different from the first image forming apparatus and information on position of the second image forming apparatus, and store the information on the function in the memory, wherein the information on the function and the information on the position of the second image forming apparatus are initially stored in the first image forming apparatus; and
notify of the second image forming apparatus capable of printing with the print settings, based on the information on the function and the information on the position obtained from the first image forming apparatus,
wherein the processor is further configured to:
acquire position information of the information processing apparatus, and
transmit the position information of the information processing apparatus to the second image forming apparatus to update the position of the second image forming apparatus to the position information of the information processing apparatus in the information on position of the second image forming apparatus when the second image forming apparatus is within a second distance with respect to the information processing apparatus, wherein the second distance is shorter than the first distance.

2. The information processing apparatus according to claim 1, wherein the processor is configured to:
determine whether or not the information processing apparatus is within the first distance based on whether or not the information processing apparatus is within a range of radio waves output from the first image forming apparatus, and
determine whether or not the information processing apparatus is within the second distance based on whether or not the information processing apparatus and the second image forming apparatus are in contact with each other.

3. The information processing apparatus according to claim 2, wherein the
second image forming apparatus is in a position closest to the information processing apparatus, among a plurality of image forming apparatuses capable of printing with the print settings.

4. The information processing apparatus according to claim 3, wherein the processor is configured to:
in a case of notifying of the second image forming apparatus in the closest position, notify of distance information on a distance to the second image forming apparatus in the closest position.

5. The information processing apparatus according to claim 3, wherein the processor is configured to:
update the stored information on the function and information on the position of the first image forming apparatus or the second image forming apparatus in the memory, each time the information on the function and the information on the position are received from the first image forming apparatus or the second image forming apparatus, and store the information on the function and the information on the position of the first image forming apparatus or the second image forming apparatuses.

6. The information processing apparatus according to claim 2, wherein the processor is configured to:

update the stored information on the function and information on the position of the first image forming apparatus or the second image forming apparatus in the memory, each time the information on the function and the information on the position are received from the first image forming apparatus or the second image forming apparatus, and store the information on the function and the information on the position of the first image forming apparatus or the second image forming apparatuses.

7. The information processing apparatus according to claim 1, wherein:

the second image forming apparatus is in a position closest to the information processing apparatus, among a plurality of image forming apparatuses capable of printing with the print settings.

8. The information processing apparatus according to claim 7, wherein the processor is configured to:

in a case of notifying of the second image forming apparatus in the closest position, notify of distance information on a distance to the second image forming apparatus in the closest position.

9. The information processing apparatus according to claim 8, wherein the processor is configured to:

update the stored information on the function and information on the position of the first image forming apparatus or the second image forming apparatus in the memory, each time the information on the function and the information on the position are received from the first image forming apparatus or the second image forming apparatus, and store the information on the function and the information on the position of the first image forming apparatus or the second image forming apparatuses.

10. The information processing apparatus according to claim 7, wherein the processor is configured to:

update the stored information on the function and information on the position of the first image forming apparatus or the second image forming apparatus in the memory, each time the information on the function and the information on the position are received from the first image forming apparatus or the second image forming apparatus, and store the information on the function and the information on the position of the first image forming apparatus or the second image forming apparatuses.

11. The information processing apparatus according to claim 1, wherein the processor is configured to:

update the stored information on the function and information on the position of the first image forming apparatus or second image forming apparatus in the memory, each time the information on the function and the information on the position are received from the first image forming apparatus or second image forming apparatus, and store the information on the function and the information on the position of the first image forming apparatus or the second image forming apparatuses.

12. The information processing apparatus according to claim 1, wherein the second image forming apparatus comprises an imaging forming memory storing the position of the second image forming apparatus, wherein the second image forming apparatus receives the position information of the information processing apparatus and updates the position of the second image forming apparatus that is stored in the image forming memory to the received position information of the information processing apparatus.

13. An image forming apparatus comprising:

a processor configured to:

detect an information processing apparatus within a predetermined first distance;

in a case where the information processing apparatus within the first distance is detected, transmit information on a function executable by each of a plurality of image forming apparatuses and information on positions of the plurality of image forming apparatuses, to the information processing apparatus; and in a case where the information processing apparatus is moved to a position that is within a second distance shorter than the first distance with respect to the image forming apparatus, receive position information of the information processing apparatus to update a position of the image forming apparatus in the information on positions of the plurality of image forming apparatuses to the position information of the information processing apparatus transmitted from the information processing apparatus.

14. The image forming apparatus according to claim 13, further comprising:

a memory storing the information on position of the plurality of image forming apparatuses, wherein the processor is configured to update a position of the image forming apparatus in the information on position of the image forming apparatuses stored in the memory with the received position information of the information processing apparatus.

15. An information processing system comprising:

the information processing apparatus according to claim 1; and the image forming apparatus according to claim 13.

16. A non-transitory computer readable medium storing an information processing program causing a computer to execute processes comprising:

receiving, in a case of executing printing with print settings using a predetermined function, from a first image forming apparatus within a predetermined first distance, information on a function executable by a second image forming apparatus different from the first image forming apparatus and information on position of the second image forming apparatus, the information on the function being stored in the first image forming apparatus, and storing the information on the function in a memory, wherein the information on the function and the information on the position of the second image forming apparatus are initially stored in the first image forming apparatus;

notifying of the second image forming apparatus capable of printing with the print settings, based on the information on the function and the information on the position obtained from the first image forming apparatus;

acquiring position information of the information processing apparatus; and transmitting the position information of the information processing apparatus to the second image forming apparatus to update a position of the second image forming apparatus to the position information of the information processing apparatus in the information on position of the second image forming apparatus when the second image forming apparatus is within a second distance with respect to the information processing apparatus, wherein the second distance is shorter than the first distance.

17. The non-transitory computer readable medium according to claim 16, wherein the second image forming apparatus comprises an image forming memory storing the position of the second image forming apparatus, wherein the second image forming apparatus receives the position information of the information processing apparatus and updates the position of the second image forming apparatus that is stored in the image forming memory to the received position information of the information processing apparatus.

* * * * *